Nov. 21, 1961     C. E. HENDEL     3,009,816
PROCESS FOR DEHYDRATING POTATOES
Filed March 16, 1960     2 Sheets-Sheet 2

CARL E. HENDEL
*INVENTOR.*

BY *R. Hoffman,*
*Attorney.*

United States Patent Office 3,009,816
Patented Nov. 21, 1961

3,009,816
PROCESS FOR DEHYDRATING POTATOES
Carl E. Hendel, Berkeley, Calif., assignor to the United States of America as represented by the Secretary of Agriculture
Filed Mar. 16, 1960, Ser. No. 15,509
3 Claims. (Cl. 99—207)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of processes for preparing dehydrated potatoes. A particular object of the invention concerns the provision of novel processes which yield dehydrated potatoes having new and improved properties, particularly enhanced moisture absorption characteristics. Further objects and advantages of the invention will be evident from the following description taken in connection with the annexed drawing. Parts and percentages set forth herein are by weight unless otherwise specified.

Figure 1:
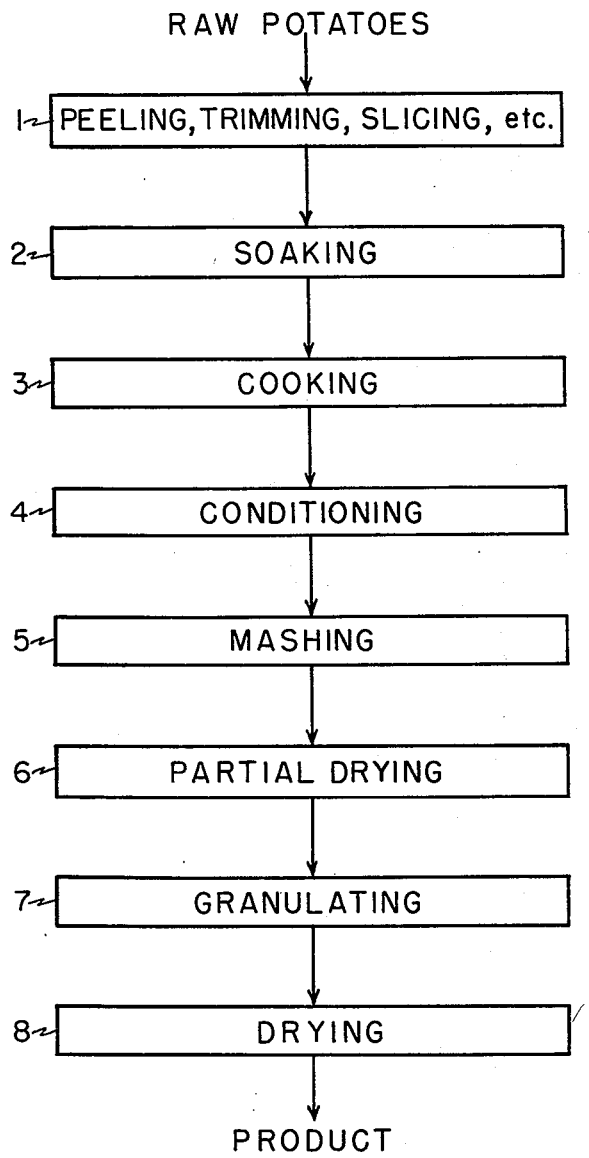
Figure 2:
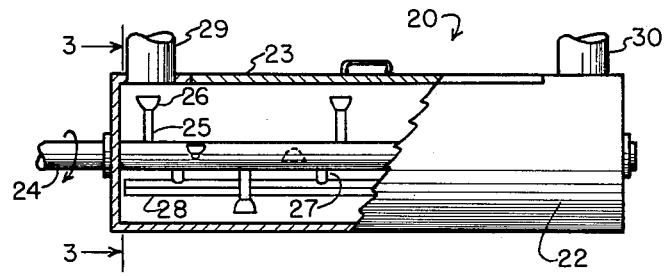
Figure 3:
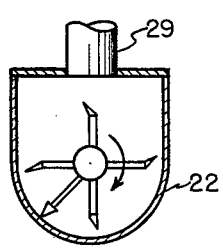
Figure 4:
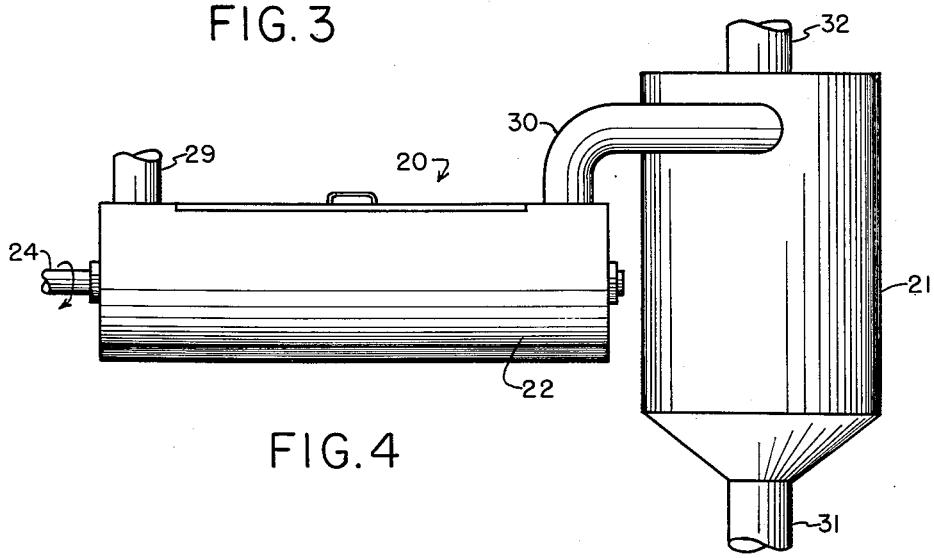

In the drawing, FIG. 1 is a schematic flow sheet illustrating procedures embodying the principles of the invention. FIG. 2 is a view, partly in cross-section, of a granulator device useful for carrying out various steps in the process, particularly granulation and drying. FIG. 3 is a cross-sectional view taken on plane 3—3 of FIG. 2. FIG. 4 illustrates the granulator of FIG. 2 used in conjunction with a collector for receiving dried product.

In the prior art various methods are disclosed for preparing mashed potatoes in dehydrated, pre-cooked form. The processes involve cooking potatoes, mashing them and applying further steps to eventually produce dehydrated products in particulate form, usually as flakes or granules. In accordance with the invention, products in this category are produced which exhibit improved properties, particularly enhanced moisture absorption. That is, when the dehydrated products are reconstituted for use, they will absorb more water than will products made by conventional methods. This means that a unit weight of dehydrated potatoes produced in accordance with the invention will yield a greater amount of reconstituted mashed potatoes than will conventional products. Thus, by applying the teachings set forth herein, dehydrated products are produced which will yield as much as 25 to 35% more reconstituted mashed potatoes as will the same weight of conventional products.

The advantages described above are attained by soaking the raw potatoes in water prior to cooking them. This soaking is extended over a period long enough to cause the potatoes to take up so much water that their weight increases by 7 to 25%. The theoretical reasons for the effect of this soaking on the moisture absorption character of the final product cannot be explained but the fact remains that it has the practical effect desired. For maximum increase in moisture absorption of the final products, the potatoes may be given a supplementary soak in water following cooking. This supplemental soak restores added water which may be expelled from the potato tissue during the cooking step.

In applying the process of the invention, potatoes are first subjected to the usual preliminary steps of washing, peeling, trimming and cutting into suitable pieces such as slabs, slices, or dice. The potatoes are then soaked in water until their weight increases about from 7 to 25%, usually 7 to 10%. Depending on such factors as piece size, variety of potato, etc., the soaking to attain this effect may require anywhere from one to four hours.

The soaking step is a useful point at which to impregnate the potato tissue with sulphite to preserve color and flavor during processing and storage of the product. Hence, the water may contain a small proportion, say 0.02 to 0.1% of sodium sulphite or bisulphite. This addition of sulphite may be used instead of, or in conjunction with, sulphiting at other stages in the process.

Following the soaking stage the potatoes are cooked. This cooking may be carried out as in conventional practice or more preferably by the method disclosed in the copending application of C. E. Hendel, G. K. Notter, and R. M. Reeve, entitled Preparation of Dehydrated Potatoes, Serial No. 15,508, filed March 16, 1960. The cooked potatoes are subsequently treated by any of the various processes which lead to the production of dehydrated potatoes in particulate form. Regardless of the type of product eventually produced, the advantages outlined above will be realized. As an example, the cooked potatoes are mashed and treated by known procedures to produce dehydrated flakes or granules. Techniques for converting mashed potatoes into such products are well known in the art and any of the procedures may be used. Techniques for producing granules are disclosed, for example, by Neel et al., Food Technology, vol. VIII, pp. 230–234, 1954, and process of producing flakes by Willard et al., U.S. Patent 2,780,552.

A preferred technique for utilizing the principles of the invention in the preparation of potato granules is described in detail below.

Referring to FIG. 1 in the annexed drawing, in stage 1 the raw potatoes are subjected to the usual preliminary steps of washing, peeling, trimming, and slicing. The tubers are generally cut into slices which may range from about one-eighth to one inch in thickness. Instead of slicing the tubers may be cut into other convenient pieces.

In stage 2, the potato pieces are soaked in water as above described.

In stage 3 the soaked potato pieces are cooked. This cooking may be carried out as in conventional practice, for example, subjecting the sliced potatoes (about ¾" thick) to boiling water or steam at the same temperature (212° F.) for about 20 to 30 minutes. In a preferred method, the cooking is carried out under special conditions as described in detail in the copending application of Hendel, Notter, and Reeve, entitled "Preparation of Dehydrated Potatoes," Serial No. 15,508, filed March 16, 1960. In this cooking method controlled conditions of temperature and time are used whereby to attain proper cooking coupled with minimum stickiness of the final product when it is reconstituted. As examples of cooking under these special conditions the potatoes are cooked at 190° F. for 30 to 180 minutes; or at 200° F. for 12 to 45 minutes; or at 212° F. for 5 to 10 minutes. These exact conditions need not be used but one may use any of the conditions of time and temperature correlated as shown in FIG. 6 in said application. In cooking in accordance with the method described therein a temperature of about 190° F. is preferably used as providing most accurate control, uniformity of cooking, and independence of the size of potato pieces.

After cooking the potatoes, they may be re-soaked in water to restore moisture lost during cooking, as described above.

Following the cooking step, or the re-soaking step, the potatoes are conditioned directly or after a light mashing or ricing operation, applying the minimum of mechanical force necessary to break up the potato tissue. In this conditioning step (stage 4) the potatoes are treated to eliminate their doughy texture and make them friable. The conditioning may be carried out at above-freezing temperatures, for example, about from 90° F. down to 30° F. or at below-freezing temperatures, for example, about from 29° F. down to minus 10° F. The conditioning is preferably carried out under static conditions, that is, the potato material is not subjected to any mechanical action. The time required for conditioning will vary according to the temperature, the time for conditioning being decreased with lowered temperature. For example, in conditioning at above-freezing temperatures, the time of treatment is about one-half to four hours, whereas with sub-freezing temperature the material is conditioned essentially as soon as it is frozen.

In stage 5 the conditioned potato material is mashed. In the event that the conditioning is carried out at sub-freezing temperature levels, the potato tissue is, of course, thawed before mashing. Application of a current of warm air to the frozen material may be applied to hasten thawing. The mashing operation may be carried out by pressing the potatoes between warm rolls, by pressing them through a screen, or by other conventional potato-mashing techniques. Pressing through a coarse screen—for example, a 6-mesh screen—is a preferred technique as by this treatment mashing is achieved and at the same time bits of peel, eyes, and other debris may be readily removed from the potato material. During or after mashing, various additives may be incorporated into the mash. Thus, to preserve color and flavor, a minor proportion of sodium sulphite or bisulphite may be added. Generally, enough sulphite is added to provide about 200 to 500 p.p.m. of $SO_2$ on a dry basis, including that incorporated in any previous steps. Minor proportions of fat-stabilizing antioxidants such as nordihydroguaiaretic acid, butylated hydroxy anisole, butylated hydroxy toluene, etc., may be added to prevent rancidification of the natural fat in the product on storage. To increase the ability of the product to absorb moisture and to reduce stickness, edible dispersing agents such as the monoglyceryl esters of long-chain fatty acids may be incorporated in the mash. Other substances which may be added are such food ingredients as salt, whole milk solids, non-fat milk solids, etc.

In stage 6 the mashed potatoes are partially dried to reduce their mositure content to the range 50 to 75%, preferably about 60%. The partial dehydration may be done in any of the conventional ways. A preferred method is to spread the mash in a thin layer and subject it to a current of warm air, about 80–150° F., while it is subjected to a fluffing action—applied, for example, by rotating blades or paddles. Another plan is to use a shaker drier wherein the potato material is supported on a screen subjecting to shaking or vibrating while a current of warm air is directed up through the screen.

In stage 7, the conditioned material is granulated and dried through the critical moisture range, as described and claimed in the copending application of Hendel, Notter, Lazar, and Talburt, Serial No. 15,551, filed March 16, 1960. The granulation and drying are carried out either simultaneously or in closely successive operations repeated a number of times. (Where conditioning is carried out at sub-freezing temperature, the mash is thawed before granulating.) In this granlulating step the aim is to subdivide the mash into particles containing not more than about ten individual cells, preferably unicellular particles, and it must be done by separating one cell from one another rather than by rupturing individual cells. Were the latter to be done the product would yield a pasty, unpalatable mass on reconstitution. The granulation can be successfully accomplished by applying to the mass repeated mild compression and mild shear forces. Preferred methods by which this end can be attained are explained below in connection with FIGS. 2, 3, and 4. Any coarse potato material present after granulation may be recycled back to the conditioning step (stage 4).

In stage 8, the granulated potato material is further dehydrated to produce the dried granlues. This final dehydration may be carried out in any manner as is conventional in the art. As an example, the potato material may be dehydrated by procedures incorporating the principle of fluidization. To this end, the potato material is placed in a vessel provided with means for jetting minute streams of hot air up through the bed of material tending to keep it in a fluidized state while being dried. Apparatus of this type and method of employing it to dehydrate moist potato particles are disclosed by Neel et al. (Food Technology, 1954, vol. VIII, pp. 230–234). To further promote fluidization of the product in the early part of this drying operation, this fiuilized-bed drier can be subjected to continuous vibration or shaking, or a mechanical agitator can be employed. In the alternative, the granulated potato material may be dehydrated in pneumatic-type driers, for instance, a device of the type disclosed by Olson et al. in Food Technology, vol. VII, pp. 177–181 (1953). This device consists essentially of a long, vertically positioned duct. Hot air at about 212–392° F. is forced upwardly at high velocity (i.e., about 1000 ft./min.) through the duct and the friable granulated potato material is fed into this air stream. As the current of air carries the material upward it is dehydrated. At the top of the duct is a conically diverging diffuser so that as the current rises into the diffuser its velocity is gradually diminished. A deflector is positioned above the diffuser whereby the now slowly moving current is deflected downward causing the dried potato granules to drop out of the air stream so that they can easily be separated from the moist exhaust air. In a preferred method, the final dehydration is accomplished while the potato material is subjected to repeated mild compression and mild shear forces, as described below in connection with FIG. 4. In any event, after final drying the product has a moisture content of about 5 to 8%, preferably about 6%.

Reference is now made to FIGS. 2 and 3 which illustrate one modification of apparatus for effecting the granulation and drying through the critical moisture zone. The apparatus, generally designated as 20, comprises a trough or U-shaped chamber 22 provided with a removable lid 23 and a longitudinal shaft 24. Suitable equipment, not illustrated, is provided to rotate shaft 24 in the direction shown at a low speed—about 1 to 5 r.p.m. Attached to shaft 24 are a series of arms 25, each bearing a paddle 26. Dimensions are so chosen that the tips of paddles 26 have a clearance on the order of one-fourth to one-half inch from the cylindrical base of trough 22. Also positioned on shaft 24 are arms 27 which carry a blade 28 which extends essentially the length of trough 22. Blade 28 is made of flexible material such as silicone rubber (Silastic), neoprene, Teflon or other elastomer and is so positioned that its edge actually wipes against the cylindrical base of trough 22. This base may be provided with small protuberances, as by welding wires longitudinally along it, to increase the shearing effect to the desired level. An inlet conduit 29 is provided for introduction of gaseous media, for example, air for drying.

In using the illustrated device to granulate the potato material, conditioned potato mash—produced as above described—is introduced into trough 22. Shaft 24 is then caused to rotate and drying air is introduced through inlet conduit 29. The resulting action of paddles 26 and blade 28 effect the granulation of the potato material. Thus, paddles 26 cause a repeated mixing of the material and a disintegration of the larger aggregates of cells. Blade 28 being actually in contact with the cylindrical base of trough 22 effects a further size reduction of the particles. The reduction in particle size effected by the device is essentially limited to separation of individual cells one from another as contrasted with rupture of individual cells. Important in this regard is the fact that paddles 26 and blade 28 exert what may best be termed as mild compression and mild shear forces. Thus the mechanical forces exerted by these elements are of sufficient intensity to separate agglomerated cells but insufficient to rupture individual cells. The action is continued until the potato material forms a well-granulated mass of unicellular particles and small aggregates of unicellular particles that have only a very slight tendency to agglomerate together. Any agglomerates formed are very readily separated from one another. This is at the lower end of the critical moisture region where the potato material contains about 32 to 45% water, the precise moisture value depending somewhat on the previous history of the material. During the granulation, the potato material is contacted with a current of air, for example, at a temperature about from 75 to 200° F., to cause the desired reduction in moisture content during granulation. Ordinarily, the product remains at room temperature (about 75° F.) during the granulation. The warm air introduced does not appreciably raise the temperature of the potato material because of the cooling effect as water is evaporated therefrom.

Moreover, our researches have shown that there is an important relationship between the properties of the potato material, as regards granulation, and its moisture content. Knowledge of this relationship permits us to obtain significant advantages in the production of potato granules. It has been found that the granulation is most effectively accomplished while the moisture content of the potato material is reduced from about 50% down to about 35%, this range being herein designated as the critical moisture range. Thus, our researches have indicated that if the granulation is applied only at higher moisture levels (that is, above about 50%) the product retains so much cohesiveness that the particles will re-aggregate when subjected to subsequent operations. On the other hand, if the granulation is not effected until the moisture content of the mash is reduced to below 35%, the potato material is so horny that it cannot be subdivided without cell rupture. However, where the granulation is conducted while repeatedly applying the mild compression and mild shear forces and simultaneously contacting the mash with a draft of drying gas, this treatment being continued while the moisture content of the mash passes through the range from about 50% moisture down to about 35% moisture, the potato material is effectively granulated without cell rupture and the granulated product displays a minimum tendency to cohere in subsequent operations. In operating under this system, it is evident that there is at least a partial merging of stages 7 and 8 because in both of these stages there is granulation as well as drying.

The apparatus illustrated in FIGS. 2 and 3 can be employed for drying the granulated potato material. Indeed, this is a preferred method as it permits reducing the moisture content through the critical zone mentioned above while simultaneously subjecting it to granulation with mild compression and mild shear forces. To this end the granulator 20 is connected to a product-collection system as shown in FIG. 4. Referring to this figure, the exit conduit 30 is connected to collector 21. In operation, the dried product is carried by the current of air out of trough 22 into collector 21, the product dropping through discharge port 31 and excess drying air being released through vent 32. In drying in this way, the amount and temperature of the air introduced into the system via conduit 29 are increased above the levels used in the preceding stage. Thus, for example, the air temperature used is about from 150 to 250° F. The velocity of the air is increased so that the current is strong enough to carry out from trough 22 the fine dry particles. During the drying cycle, shaft 24 is rotated, as during the granulation, to maintain the potato material in a loose and bulky state and subdivide any larger particles found by re-aggregation of finer ones. During operation, the particles discharged from pipe 31 are examined and the velocity of the air stream adjusted so that essentially only the properly-dried, fine particles are carried by the air stream into the collector and the aggregated particles remain in chamber 22 for further drying and subdividing.

It is further evident that granulation and drying need not necessarily be carried out as separate and distinct steps. Thus, for example, the conditioned potato material may be introduced into trough 22 and shaft 24 started to rotate, this being continued throughout the process. At first, air at about room temperature is introduced into the system through conduit 29. Then as the operation continues the air temperature is gradually increased up to suitable temperatures for drying. Likewise, during the later stage of the process, the velocity of the air stream is likewise increased to entrain the dried fine particles and carry them out of the trough.

The step of granulation with concomitant drying through the critical moisture region, the final drying or both these steps may also be effectuated in the device depicted in FIG. 5 in the copending application of Hendel, Notter, Lazar, and Talburt, Serial No. 15,511, filed March 16, 1960.

The preferred procedure as described hereinabove enables the production of potato granules of high moisture absorption properties. Moreover, the process yields granules directly, that is, without necessity for add-back of seed granules from a previous run. The advantages inherent in eliminating add-back are explained at length in the copending application of Hendel, Notter, Lazar, and Talburt, Serial No. 15,511, filed March 16, 1960. Moreover, the granules so produced are of prime quality as on addition of water they produce reconstituted mashed potatoes of a desirable mealy texture, free from pastiness or lumpiness. Important in this regard is the fact that the products have a low blue value indicative of negligible cell rupture during processing. Because of this factor the products can even be reconstituted with boiling water and still obtain mashed potatoes of desirable mealy texture. Were there substantial cell rupture, reconstitution with boiling water would yield pasty masses. Noteworthy also is the factor that the products retain a natural, high-quality potato flavor and color.

The invention is further demonstrated by the following illustrative examples.

In the examples, products were tested for blue value index by the method of Mullins et al. (Food Technology, vol. 9, p. 393) on a basis of 2½ grams of dry solids. This determination furnishes a measure of release of free starch from the cells and a higher value denotes more free starch. In another test, moisture absorption of the product was measured by a modification of the method of Potter (Jour. Ag. and Food Chem., vol. 2, p. 516; 1954). This test determines the volume of reconstituted mashed potatoes formed per unit weight of dried granules. In this case a higher value indicates a superior product as more mashed potatoes are formed from a standard amount of dry material.

*Example I*

Idaho Russet Burbank potatoes were washed, peeled, trimmed, cut into pieces ½" x ½" x ¾", and washed to remove free starch.

The potato pieces were soaked two hours in water at room temperature containing 0.02% sodium bisulphite. The weight gain due to absorption of water was 7%.

The soaked potatoes were cooked in water (containing 34 grams sodium bisulphite per 150 lbs. water) at 190° F. for 60 minutes.

The cooked potatoes were then divided into three lots. The potatoes of lot A were frozen at 10° F. Those of lot B were soaked in water at room temperature for 20 minutes, then frozen at 10° F. Those of lot C were soaked in water at room temperature for 1½ hours, then frozen at 10° F.

All three lots were then treated as follows: The potatoes were thawed in warm air, mashed, and spread on trays and exposed to a current of air at about 100° F. to partially dehydrate them. After 1½ hours of this treatment, moisture content of the potatoes was about 70%.

The partially dehydrated potatoes were then placed in the granulating device with collector attached as depicted in FIG. 4. The shaft was rotated at 6 r.p.m. and air at 250° F. was blown through the device. In about 20 minutes the process was complete and the dried granules (about 20% moisture content) were removed from the collector. These granules were finish-dried in a fluidized-bed drier to produce granules of about 6% moisture content.

The products were tested for moisture absorption by the method of Potter (Jour. Ag. and Food Chem., vol. 2, p. 516; 1954). This test determines the volume of reconstituted mashed potatoes formed by unit weight of dried granules. In this test, a higher value denotes a superior product as more mashed potatoes are formed from a standard amount of dry product.

The following results were obtained:

| Lot | Moisture absorption, ml. of reconstituted mash/gram of granules |
|---|---|
| A | 6.8 |
| B | 7.0 |
| C | 7.5 |

In a control experiment wherein the soaking was omitted, the product had a moisture absorption of 6.4 ml./g.

*Example II*

Idaho Russet Burbank potatoes were washed, peeled, trimmed, cut into 1/8 inch slices, and washed to remove free starch.

The slices were soaked in water at room temperature for 2½ hours. The weight increase due to absorption of water was 17%.

The slices were cooked in water at 190° F. for 80 minutes.

The cooked slices were riced through a 2-mesh screen and divided into two lots:

A. One lot of the coarsely-mashed product, containing a large proportion of lumps of about 3/8 inch diameter, was spread in a layer ½ inch deep and frozen at 10° F.

B. The other lot was mashed for one minute in a planetary-type mixer to produce a finer mash containing only a few lumps of 1/16 to 1/8 inch diameter. This mash was also spread in a layer ½ inch deep and frozen at 10° F.

Both lots were then thawed and mashed by passing through a double drum apparatus—drum temperature 120° F., clearance between drums 0.015", speed of drums 1 r.p.m.

The mashed potato material was dried on trays in a cabinet drier with occasional hand fluffing—temperature of the air contacting the mash was 125° F.

The following results were obtained:

| Lot | Water absorption, ml. of reconstituted mash/gram of product |
|---|---|
| A | 8.0 |
| B | 7.2 |

In a control experiment omitting the soaking but including the mashing as in lot B, the water absorption of the product was 6 ml./g.

*Example III*

Idaho Russet Burbank potatoes were washed, peeled but not trimmed, cut into pieces ½" x ½" x ¾", and washed to remove free starch.

The slices were soaked in water at room temperature for two hours—weight increase was 8%.

The slices were cooked 60 minutes in water at 190° F. containing 0.1% NaHSO₃.

The cooked slices were spread on trays, one layer deep, and frozen at 10° F. The frozen potatoes were then thawed by exposing them to a current of air at 100° F.

The thawed potatoes were mashed in a planetary-type mixer for a minute, then pressed through a 6-mesh screen. Peel fragments, eyes, and bruised tissue remained on the screen and were discarded.

The mash was then partially dried on a belt equipped with a pair of rotating blades to apply mild compression and mild shear forces to the potato material. During travel on the belt the potato material was contacted with a current of air at 212° F. and as the material reached the end of the belt it was discharged into an upwardly directed draft of air at 260° F. The potato mash was given six passes over the belt over a period of 20 minutes—moisture content of the product was 60%.

The partially dried mash was transferred to the granulator device of FIGS. 2 and 3 wherein it was exposed to a current of air at 150° F. and the shaft was rotated at 2 r.p.m. In about 20 minutes the material was granulated and its moisture content was 35%. The action was continued until the product was reduced in moisture content to 20%, then it was finish-dried in a fluidized-bed drier. The dehydrated granules had a blue value index of 22 and a moisture absorption of 7 ml./gram.

Having thus described the invention, what is claimed is:

1. The method of preparing dehydrated potatoes which comprises soaking raw peeled potatoes in water at about room temperature until their weight increases by about 7 to 25% due to absorption of water, cooking the soaked potatoes and subjecting them to dehydrating conditions to produce dehydrated potatoes.

2. The method of preparing dehydrated potatoes which comprises soaking raw peeled potatoes in water at about room temperature until their weight increases about 7 to 25% due to absorption of water, cooking the soaked potatoes, re-soaking the cooked potatoes in water at about room temperature to restore added water lost during the cooking step, and subjecting the potatoes to dehydrating conditions to produce dehydrated potatoes.

3. The method of preparing dehydrated potatoes which comprises soaking raw peeled potatoes in water at about room temperature until their weight increases by about 7 to 25% due to absorption of water, cooking the soaked potatoes, conditioning the cooked potatoes until they lose their doughy texture and become friable, mashing the conditioned potatoes, partially dehydrating the mash to a moisture content of about from 50 to 75%, subdividing the partially-dehydrated mash into fine particles and applying dehydrating conditions to produce dehydrated potatoes in particulate form.

References Cited in the file of this patent

UNITED STATES PATENTS

| | | |
|---|---|---|
| 611,017 | Neumann | Sept. 20, 1898 |
| 1,299,493 | Mangelsdorff | Apr. 8, 1919 |
| 2,176,347 | Jansen | Oct. 17, 1939 |
| 2,780,552 | Willard et al. | Feb. 5, 1957 |
| 2,959,487 | Notter et al. | Nov. 8, 1960 |